US012675415B2

(12) United States Patent
McLellan et al.

(10) Patent No.: US 12,675,415 B2
(45) Date of Patent: Jul. 7, 2026

(54) METHOD OF IMPROVING L1 ICACHE PERFORMANCE WITH LARGE PROGRAMS

(71) Applicant: Marvell International Ltd., Hamilton (BM)

(72) Inventors: Edward McLellan, Holliston, MA (US); Alexander Rucker, Stanford (CA); Shay Gal-On, Mountain View, CA (US); Srilatha Manne, Seattle, WA (US)

(73) Assignee: Marvell Asia Pte, Ltd., Singapore (SG)

( * ) Notice: Subject to any disclaimer, the term of this patent is extended or adjusted under 35 U.S.C. 154(b) by 365 days.

(21) Appl. No.: 16/568,698

(22) Filed: Sep. 12, 2019

(65) Prior Publication Data

US 2021/0081323 A1 Mar. 18, 2021

(51) Int. Cl.
*G06F 12/08* (2016.01)
*G06F 12/0862* (2016.01)
*G06F 12/0893* (2016.01)

(52) U.S. Cl.
CPC ...... *G06F 12/0893* (2013.01); *G06F 12/0862* (2013.01); *G06F 2212/1021* (2013.01); *G06F 2212/452* (2013.01); *G06F 2212/602* (2013.01); *G06F 2212/6024* (2013.01); *G06F 2212/608* (2013.01)

(58) Field of Classification Search
CPC ............. G06F 12/0893; G06F 12/0862; G06F 2212/1021; G06F 2212/452; G06F 2212/602; G06F 2212/6024; G06F 2212/608
See application file for complete search history.

(56) References Cited

U.S. PATENT DOCUMENTS

| | | | | |
|---|---|---|---|---|
| 6,253,309 | B1 * | 6/2001 | Mahalingaiah | G06F 9/30149 712/210 |
| 2005/0055505 | A1 * | 3/2005 | Day | G06F 12/126 711/133 |
| 2008/0140996 | A1 * | 6/2008 | Morrow | G06F 12/0862 712/E9.055 |
| 2012/0117327 | A1 * | 5/2012 | Venkumahanti | G06F 9/3844 711/125 |
| 2015/0169041 | A1 * | 6/2015 | Blasco | G06F 9/3806 713/320 |
| 2015/0339233 | A1 * | 11/2015 | Kapil | G06F 12/10 711/137 |
| 2016/0019065 | A1 * | 1/2016 | Hayenga | G06F 9/3802 712/207 |
| 2016/0217079 | A1 * | 7/2016 | Lin | G06F 12/0875 |
| 2017/0322885 | A1 * | 11/2017 | Mukherjee | G06F 12/0897 |
| 2018/0189651 | A1 * | 7/2018 | Henry | G06N 3/0454 |

* cited by examiner

*Primary Examiner* — Gautam Sain

(57) ABSTRACT

The hit rate of a L1 icache when operating with large programs is substantially improved by reserving a section of the L1 icache for regular instructions and a section for non-instruction information. Instructions are prefetched for storage in the instruction section of the L1 icache based on information in the non-instruction section of the L1 icache.

22 Claims, 5 Drawing Sheets

100

Access a L1 iCache that Stores Regular Instructions and Non-Instruction Information to Obtain a Regular Instruction    110

Prefetch Regular Instructions to be Stored in the L1 icache Based on Non-Instruction Information Stored in the L1 icache when the Regular Instruction is not Present in the L1 iCache.    112

200

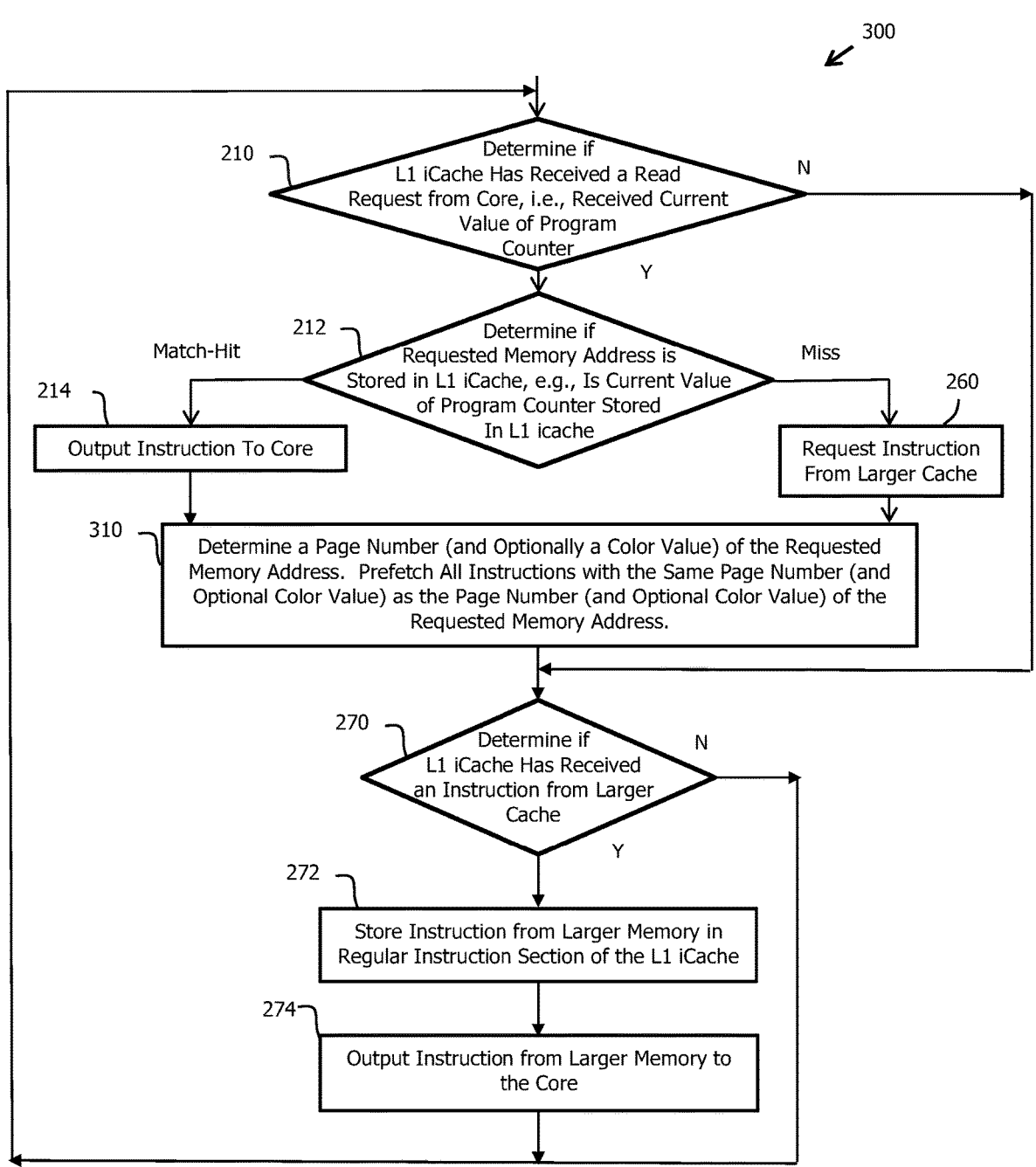

300

210 — Determine if L1 iCache Has Received a Read Request from Core, i.e., Received Current Value of Program Counter

N

Y

212 — Determine if Requested Memory Address is Stored in L1 iCache, e.g., Is Current Value of Program Counter Stored In L1 icache Match-Hit Miss 214 — Output Instruction To Core 260 — Request Instruction From Larger Cache 310 — Determine a Page Number (and Optionally a Color Value) of the Requested Memory Address. Prefetch All Instructions with the Same Page Number (and Optional Color Value) as the Page Number (and Optional Color Value) of the Requested Memory Address.

270 — Determine if L1 iCache Has Received an Instruction from Larger Cache

N

Y

272 — Store Instruction from Larger Memory in Regular Instruction Section of the L1 iCache 274 — Output Instruction from Larger Memory to the Core

FIG. 3

METHOD OF IMPROVING L1 ICACHE PERFORMANCE WITH LARGE PROGRAMS

BACKGROUND OF THE INVENTION

1. Field of the Invention

The present invention relates to caches and, more particularly, to a method of improving the L1 icache performance with large programs.

2. Description of the Related Art

The chip area near the CPU processing pipeline, and overall power, are critical resources in any processor design. All hardware structures must be justified for inclusion in a design based on performance contribution and power usage. Features that only benefit selected modes of operation must be considered carefully and are often removed or minimized to save area and power.

Caches are a well-known approach to reducing the latency associated with the CPU accessing the instructions and data stored in the main memory of a computer system. Cache prefetching attempts to predict the information that the CPU will need, and then obtain and store the information before the CPU requests the information so that when the information is needed the CPU can access it quickly.

L1 caches are volatile memories located near the CPU processing pipeline, and have very short access times, typically requiring three to four clock cycles for the CPU to obtain an instruction. Many computer systems also include a L2 cache that lies between the L1 cache and the main memory. L2 caches have longer access times, typically requiring 12 to 25 clock cycles for the CPU to obtain the instruction. The main memory has significantly longer access times, typically requiring a 100 clock cycles or more for the CPU to obtain the instruction.

Virtually all CPU designs include a L1 instruction cache (icache) due to the improvement in CPU performance by significantly reducing the average access time required for a CPU to obtain a requested instruction. When successful, the memory latency can be reduced from 10 to 100 clock cycles, depending on where the information is stored, down to 3-4 clock cycles.

However, even a small L1 icache is a relatively large component of a CPU. As a result, L1 icaches have significant size limitations. One of the problems with utilizing small L1 icaches is that small L1 icaches are largely ineffective when it comes to working with programs that have a large code footprint.

The main reason for this is that large programs tend to have a high number of lukewarm instructions, which are instructions that occur infrequently but often enough to stay in the cache. As a result, when executing these large programs, the L1 icache incurs frequent misses (instructions looked for but not found in the L1 icache) and few hits (instructions looked for and found in the L1 icache).

In addition, the most effective instruction prefetching requires large tables for correlation prefetchers, filter tables and other improvements. However, due to the size limitations of L1 icaches, the most effective instruction prefetching is often size constrained. Thus, there is a need for an approach that increases the effectiveness and performance of the L1 icache with large programs without increasing the size of the L1 icache.

SUMMARY OF THE INVENTION

The present invention increases the hit rate of a L1 icache when operating with large programs without increasing the size of the L1 icache. A method of operating a computer system includes accessing a L1 icache that stores regular instructions and non-instruction information to obtain a regular instruction. The method also includes prefetching regular instructions to be stored in the L1 icache based on the non-instruction information stored in the L1 icache when the regular instruction is not present in the L1 icache.

The present invention also provides a computer system that includes a L1 icache that stores regular instructions and non-instruction information, and a processor that is coupled to the L1 icache. The processor accesses the L1 icache to obtain a regular instruction. In addition, the processor prefetches regular instructions to be stored in the L1 icache based on the non-instruction information stored in the L1 icache when the regular instruction is not present in the L1 icache.

The present invention further provides a non-transitory computer-readable medium that has computer-readable instructions stored thereon which, when executed by a processor, cause the processor to execute a method of cache prefetching. The method includes accessing a L1 icache that stores regular instructions and non-instruction information to obtain a regular instruction. The method also includes prefetching regular instructions to be stored in the L1 icache based on the non-instruction information stored in the L1 icache when the regular instruction is not present in the L1 icache.

A better understanding of the features and advantages of the present invention will be obtained by reference to the following detailed description and accompanying drawings which set forth an illustrative embodiment in which the principals of the invention are utilized.

BRIEF DESCRIPTION OF THE DRAWINGS

FIG. 3 is a flow chart illustrating an example of a method 300 of prefetching instructions to be stored in a L1 icache in accordance with the present invention.

DETAILED DESCRIPTION OF THE INVENTION

Figure 1:
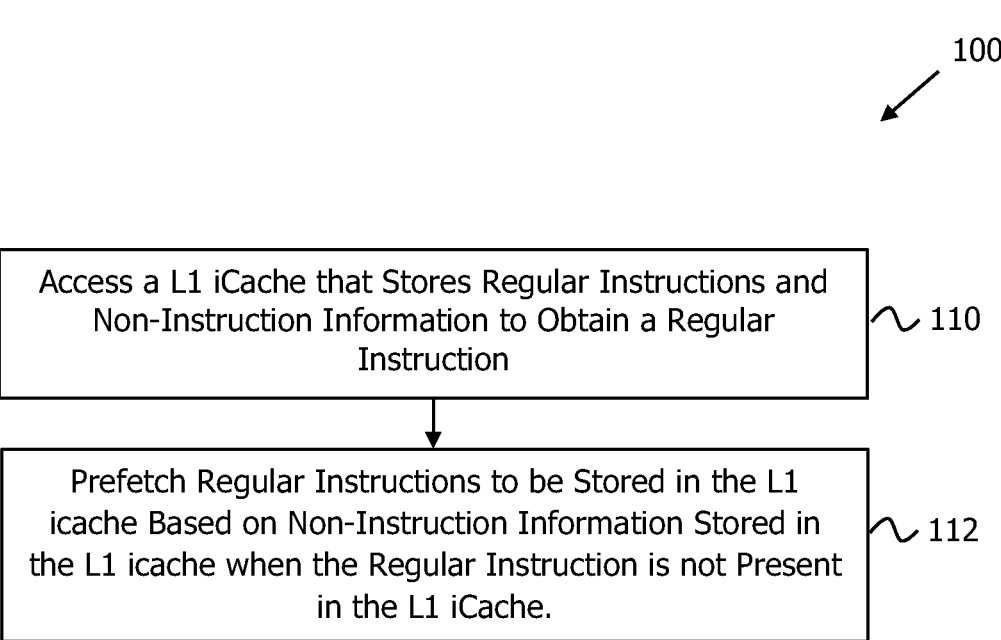
FIG. 1 is a flow chart that illustrates an example of a method 100 of operating a computer system in accordance with the present invention.

FIG. 1 shows a flow chart that illustrates an example of a method 100 of operating a computer system in accordance with the present invention. A cache is initially completely invalid and records instructions (and/or other data) after execution by the processor. Since a cache is smaller than the memory it is representing, only a portion of the data can be stored. The hardware structure (e.g. address selection, associativity, replacement algorithms) defines a "table" of sorts to map how and what post-execution data is stored.

As described in greater detail below, in the present invention, limited additional information is stored after execution to improve future performance through directed prefetching that is only used the next time the instruction sequence starts execution. The present invention significantly increases the performance of a L1 icache when working with large programs by storing non-instruction information in a section of the L1 icache.

As shown in FIG. 1, method 100 begins at 110 by accessing a L1 icache that stores regular instructions and non-instruction information to obtain a regular instruction. The L1 icache can be implemented as, for example, a multi-way set-associative L1 icache, which has a number of sets and ways. For example, a 64 Kbyte L1 icache can be arranged to have 128 sets, 8 ways per set, and 64 Bytes (512 bits) per way. Table 1 shows an example of a 64 KByte L1 icache organized with 128 sets, 8 ways, and 64 Bytes (512 bits-16 Bytesx4) per way.

TABLE 1

| Set | Way1 | Way2 | Way3 | Way4 | Way5 | . . . | Way7 | Way8 |
|---|---|---|---|---|---|---|---|---|
| 0 | 64 B (512 b) | 64 B (512 b) | 64 B (512 b) | 64 B (512 b) | 64 B (512 b) | . . . | 64 B (512 b) | 64 B (512 b) |
| 1 | | | | | | | | |
| . . . | | | | | | | | |
| 127 | | | | | | | | |

Each 64-byte way is known as a cache line, which includes a cache line valid bit, a tag, and a number of instructions. The cache is accessed by a memory address which includes a tag, an index, and an offset. The tag distinguishes different addresses that can be saved in a set, while the index identifies the set. The offset identifies one of the bytes within the cache line. (The way is identified by checking every entry in the set in parallel. No bits are used to identify the ways.) Thus, seven index bits are required to identify one of 128 sets, while six offset bits are required to identify one of the 64 bytes in a set, thereby leaving a tag of 3 bits in a 16-bit (2 byte) memory address.

In accordance with the present invention, the L1 icache is arranged to have a section for regular instructions and a section for non-instruction information. Regular instructions are recently or frequently fetched instructions, while non-instruction information includes a prefetch correlation table.

For large programs, L1 icache sizes in the range of 64 KB experience a high number of misses due to lukewarm instructions, and provide diminishing performance improvement. However, by reallocating 4 KB-8 KB of a 64 KB L1 icache storage for a prefetch correlation table in accordance with the present invention, the L1 icache provides significantly better overall performance.

There are multiple methods of allocating a section of the L1 icache for the prefetch correlation table. In a multi-way set-associative cache, which compares the output of all of the ways simultaneously and identifies a hit from any way that matches the tag comparison, a number of ways in each set of a multi-way set-associative cache are reserved and put aside to store regular instructions, e.g., six ways in each set (way1-way6) can be put aside to store regular instructions, while a number of ways in each set are reserved and put aside to store the prefetch correlation table, e.g., two ways in each set (way7-way8) can be put aside to store the prefetch correlation table. Isolating a portion of the ways for a correlation table can be accomplished by enabling or disabling comparison for ways (way7-way8) associated with the non-instruction information.

Table 2 shows an example of the information stored in each of the first six ways of a set 0, which includes a data valid bit, a memory address that includes a tag, and a number of regular instructions.

TABLE 2

| Way | Cache Line Valid | Memory Address Tag | Regular Instructions |
|---|---|---|---|
| 1 | | | |
| 2 | | | |
| . . . | | | |
| 6 | | | |

Table 3 shows an example of the non-instruction information stored in the last two ways of a set 0, which includes a prefetch correlation table.

TABLE 3

| Way | Cache Line Valid | Correlation Table | Correlation Table |
|---|---|---|---|
| 7 | | | |
| 8 | | | |

In a second example of a L1 icache, the regular instructions and the non-instruction information are intermingled and stored together in the ways of a set, except that an extra ID bit or bits are added to the tag to indicate whether the memory address belongs to a regular instruction or non-instruction information. (The extra ID bit or bits can alternately be added to any of the fields.)

Table 4 shows an example of the information stored in the 8 ways of a set 0, which includes a cache line valid bit, a memory address that includes a tag+ID bit/s, and a result. In this example, a "0" ID bit is added to the memory address to indicate a regular instruction, while a "1" ID bit added to the memory address to indicate non-instruction information.

TABLE 4

| Way | Cache Line Valid | Memory Address Tag + ID bit/s | Result |
|---|---|---|---|
| 1 | | Memory Address Tag + ID bit (0) | Regular Instructions |
| 2 | | Memory Address Tag + ID bit (1) | Non-Instruction |
| 3 | | Memory Address Tag + ID bit (1) | Non-Instruction |
| . . . | | | |
| 8 | | Memory Address Tag + ID bit (0) | Regular Instructions |

When a L1 icache is accessed, a hit for one type of information requires a tag match plus a match of the extra bit or bits associated with the desired information. It is also possible for the division between different data types to be dynamic, where feedback such as the rate of cache misses causes the portion of the L1 icache allocated for prefetch data to be modified. If dynamic resizing is utilized, cache lines that are repurposed must be invalidated before reuse.

The prefetch correlation table is an array that contains non-sequential fetch addresses for prefetching assistance.

Correlation tables are common for prefetchers but can become large. To reduce the size with minimal impact on performance, the correlation table stores an offset that is added to the lookup address to determine the correlated target address for the prefetch.

A tag in the correlation table is used to distinguish entries from each other, e.g. each 16-bit entry contains a 6-bit tag to match upper memory address bits and a 10-bit signed offset. In this way, 16 bits (2 bytes) represents a full 128-byte cache line of instructions, or a 64× information concentration in the L1 icache.

The correlation table can be addressed many ways, but a set associative organization has been shown to improve performance, e.g. 16 sets with 2 ways and 4-16 KB entries per way. Entries are replaced randomly within ways. A correlation table of 2 K, 16-bit entries or larger provides improved performance, representing 256 KB of instructions. This requires 4 KB of storage in the cache.

In addition, method 100 utilizes a filter table to avoid excessive prefetches that can add unnecessary, and detrimental, increased traffic to the memory subsystem. The filter table is an array of bits corresponding to cache lines. Bits are set as instructions retire (one bit per cache line). Bits are cleared randomly so the table does not remain completely filled with ones over time.

The filter table is used to filter potential prefetches so only addresses that were previously useful are prefetched. Since the program is much larger than the cache, many addresses are misses, but the filter table allows prefetches to focus on addresses that have been useful in the past. This reduces unnecessary and unwanted accesses to the L2 and larger memories.

A filter table using 1 bit per cache line maps the recent usefulness of a larger address space. Cache lines are 128 Bytes in this example. A 1 KB array maps to a 1 MB address region. A 256 Byte array maps to a 256 KB address region. The filter table is accessed prior to every prefetch, and does not need to be large to be effective.

Method 100 is executed by a processor that is pipelined for performance with an early pipeline stage that fetches instructions from the L1 icache. The early pipeline stage is followed by multiple pipeline stages that execute the instructions. In addition, a late pipeline stage includes instruction retirement where results are committed.

At reset time, the program counter in the instruction fetch stage is initialized to a preset or configured value to start program execution and fetch the first instruction. After each instruction is fetched and decoded, the program counter is updated, typically by an increment to the next sequential instruction, but branches can generate a non-sequential program counter update. At any time, program execution in later pipeline stages can also cause the program counter to be updated to redirect and restart the execution pipeline. The most common restart update is for a branch misprediction.

In the present invention, method 100 utilizes a next-line sequential prefetcher, a correlated prefetcher (which includes a prefetch correlation table), and a filter table. As the name suggests, the next-line sequential prefetcher increments the value of the program counter, and then fetches the instruction located at the address that corresponds to the incremented value of the program counter.

The correlated prefetcher tracks non-sequential accesses in a prefetch correlation table. In the present example, the prefetch correlation table maintains a mapping from the address of a missed memory address to a cache line offset that identifies the memory address of a predicted next memory address in the L1 icache.

Referring again to FIG. 1, after receiving an instruction from the L1 icache in 110, method 100 moves to 112 to prefetch regular instructions to be stored in the L1 icache based on the non-instruction information (e.g., the prefetch correlation table) stored in the L1 icache when the regular instruction is not present in the L1 icache.

Figure 2A:
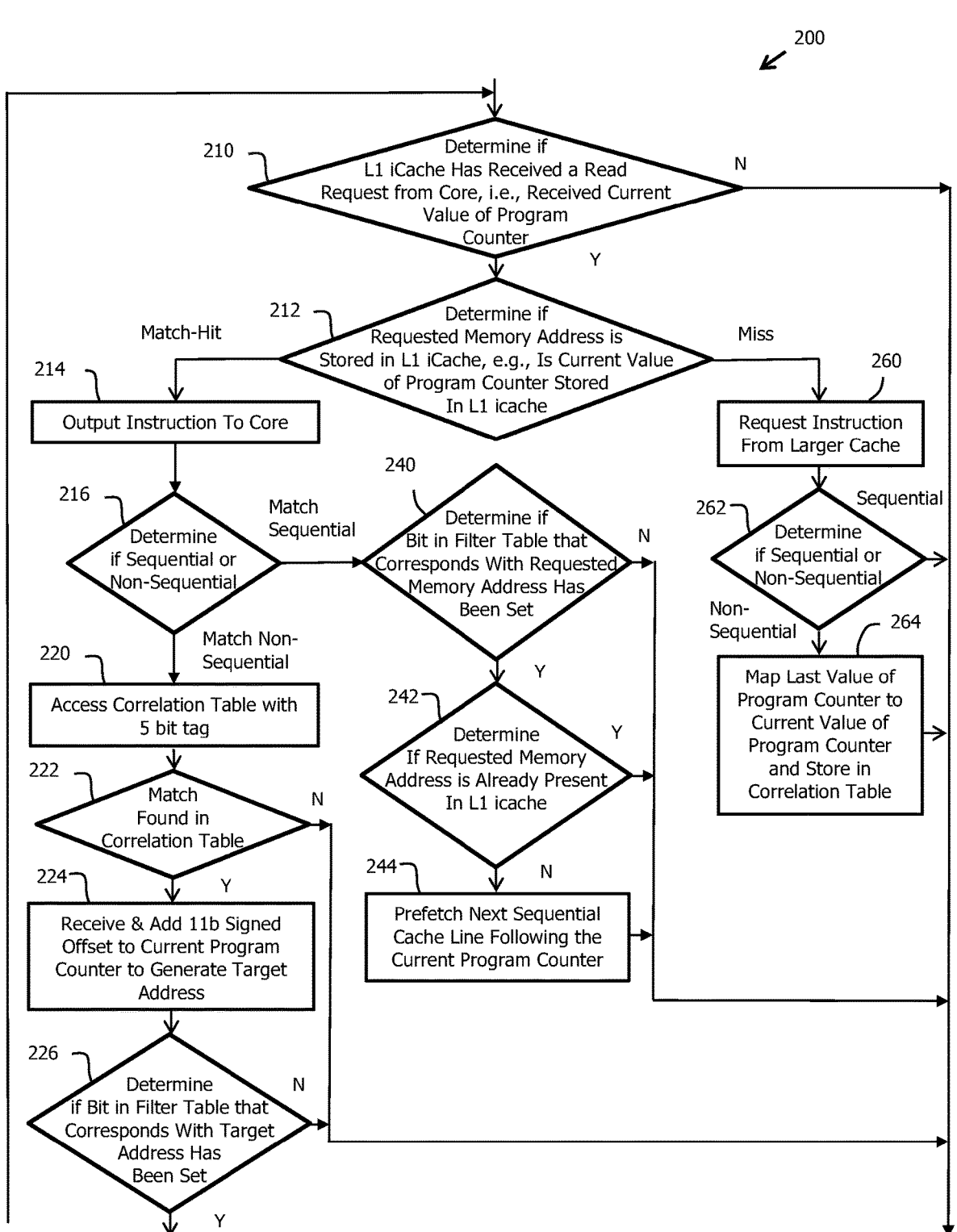
FIGS. 2A-2B are a flow chart illustrating an example of a method 200 of fetching and prefetching instructions and constructing non-instruction prefetch tables for use with a L1 icache in accordance with the present invention.
Figure 2B:
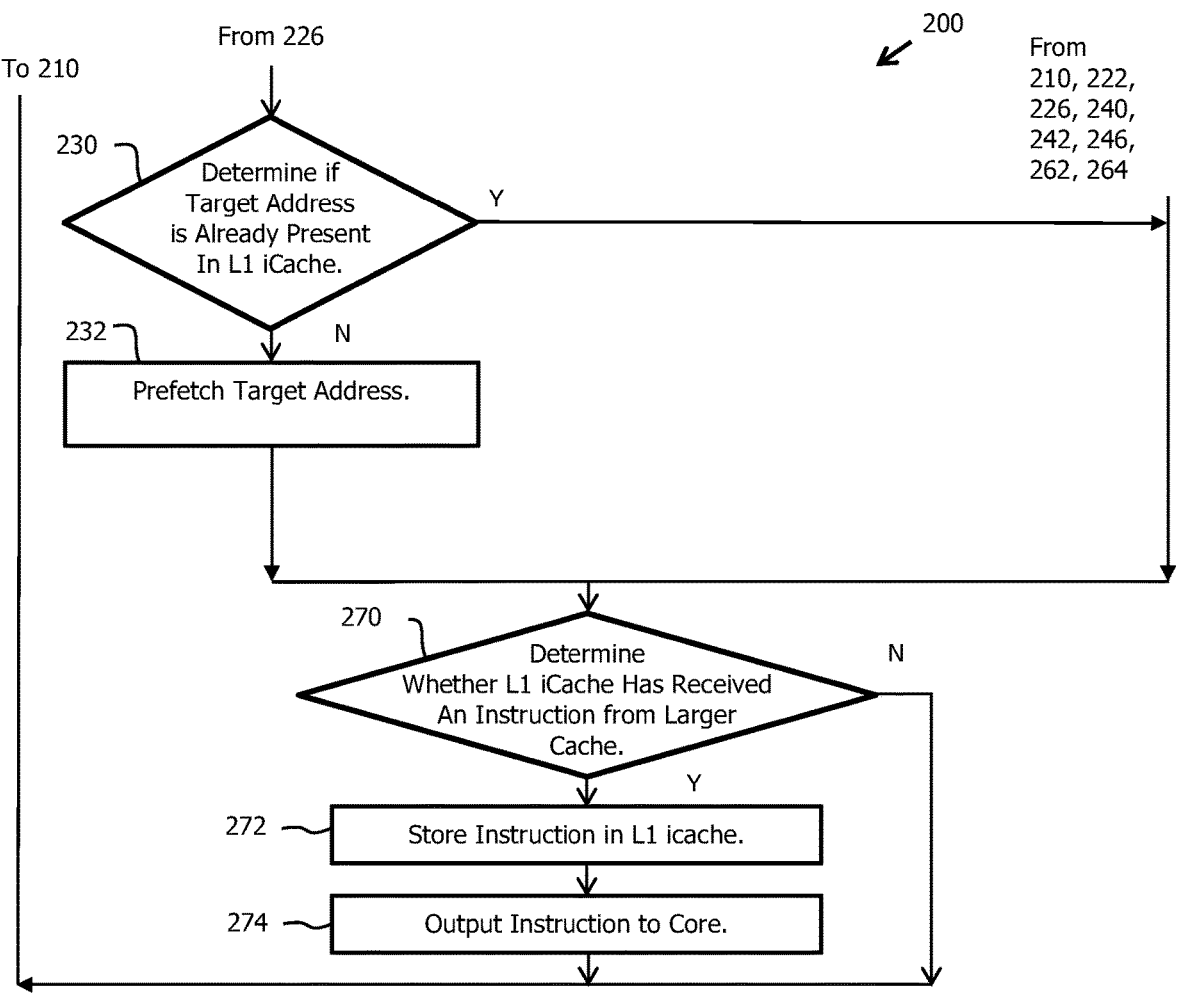

FIGS. 2A-2B show a flow chart that illustrates an example of a method 200 of fetching and prefetching instructions and constructing non-instruction prefetch tables for use with a L1 icache in accordance with the present invention. As shown in FIGS. 2A-2B, method 200 begins at 210 by determining whether the L1 icache has received from a processor a read request to obtain the instruction located at a specific memory address. The request includes the current value of the program counter, which represents the specific memory address.

When a read request has been received, method 200 moves to 212 to determine if the specific memory address is stored in the L1 icache, i.e., determine whether the current value of the program counter matches a valid line within the L1 icache. When the current value and a L1 icache line match, the match is referred to as a 'hit,' while when the current value does not match any of the valid cache lines, the non-match is referred to as a 'miss.'

When there is a L1 icache hit, method 200 moves to 214 to output the instruction to the processor, and then to 216 to determine if the current value of the program counter is sequential or non-sequential. If the current value of the program counter is greater than the last value of the program counter by one, then the current value of the program counter is sequential. If the current value of the program counter is greater than the last value of the program counter by more than one, then the current value of the program counter is non-sequential.

When non-sequential, method 200 moves to 220 to access the correlation table, and then to 222 to determine whether a match was found in the correlation table. For example, method 200 can use 14 bits from the program counter to access a 4 KB correlation table in the following manner. A 4-way set associative organization would use the lower 9 bits from the program counter to select a group of four 16-bit entries where each entry contains an 11-bit signed offset and a 5-bit tag. The tags from all entries are compared against the remaining upper 5 bits of the program counter where a match indicates a hit and a mismatch indicates a miss. When there is a hit, method 200 moves to 224 to receive an 11-bit signed offset from the correlation table, which is then added to the program counter to generate a new, non-sequential target address.

After this, method 200 moves to 226 to access the filter table. For example, method 200 inputs the target address into the filter table, and receives a determination from the filter table as to whether the target address has been useful in the past. If the target address has been useful in the past, method 200 moves to 230 to determine if the target address is already stored in the L1 icache. When the target address is not stored in the L1 icache, method 200 moves to 232 to prefetch the target address.

Referring back to 216, when the current value of the program counter is sequential, method 200 moves to 240 to access the filter table. For example, method 200 inputs the specific address (current value of the program counter) into the filter table, and receives a determination from the filter table as to whether the specific address has been useful in the past. If the specific address has been useful in the past, method 200 moves to 242 to determine if the specific address is already stored in the L1 icache. When the specific address is not stored in the L1 icache, method 200 moves to 244 to prefetch the next sequential cache line.

Referring back to 212, when there is a L1 icache miss, method 200 moves to 260 to request the instruction from a larger memory, such as a L2 cache or the main memory, and then to 262 to determine if the current value of the program counter is sequential or non-sequential. When the current value of the program counter is non-sequential, method 200 moves to 264 to map the last value of the program counter to the current value of the program counter and store the mapping in the correlation table within the L1 icache.

Method 200 moves to 270 from 210 when there is no read request, from 222 when there is no match in the correlation table, from 226 when the filter table indicates that the target address is not useful, from 230 when the target address is already in the L1 icache, from 240 when the filter table indicates that the specific address is not useful, from 242 when the filter table indicates that the specific address is not useful, from 244 when the specific address is already in the L1 icache, from 262 when the memory address is sequential, and from 264 after the mapping has been added to the correlation table.

In 270, method 200 determines whether an instruction has been received from the larger memory (e.g., L2 cache). When no instruction has been received, method 200 returns to 210 to check for read requests. When an instruction has been received, method 200 moves to 272 where the L1 icache stores the memory address and instruction from the larger memory in the L1 icache. Next, method 200 moves to 274 where the L1 icache outputs the instruction to the processor. Method 200 then returns to 210.

One of the advantages of the present invention is that by storing the correlation table in a section of the L1 icache, a correlation prefetcher can be effectively used along with a next-line prefetcher to significantly improve the hit rate of a L1 icache when handling a large program (program with large code footprint).

Another advantage of the present invention is that by utilizing a next-line prefetcher after a predicted next memory addresses has been identified from the correlation table, the combined prefetcher is able to eliminate many of the accesses to the correlation table. As a result, in accordance with the present invention, the correlation table can be stored in the same array as the L1 icache.

The correlation table can be either statically or dynamically partitioned from the data section of the cache by setting a bit in the cache tags. By limiting the number of prefetches that are needed to access the correlation table, the contention between fetch and prefetch for bandwidth to the L1 icache is reduced.

In an alternate embodiment of the present invention, the non-instruction information can be a prefetch mask (prefetch hints identifying useful cache lines within a page) with color information. When a cache miss is detected, the next several instructions that are most likely to be executed are instructions from the same page as the missed instruction.

In accordance with the present invention, the memory addresses and associated instructions that have the same page number as the page number of the last instruction to be output by the L1 icache are prefetched from a larger memory (e.g., a L2 cache or main memory) and stored in the L1 icache in the instruction information ways (e.g., way1-way6).

As noted above, a L1 icache typically has a low L1 icache hit rate, and is largely ineffective, when working with large programs. However, since the next most likely instructions to be executed are from the same page as the last instruction to be executed, the page prefetching of the present invention substantially increases the hit rate and the effectiveness of the L1 icache when working with large programs.

In the event that a particular application has a large number of memory addresses and associated instructions that have the same page number, a color value can be associated with each memory address and associated instruction to limit the number of memory addresses and associated instructions that are prefetched. The color value represents a time range that includes the time that the instruction was fetched by a processor.

In operation, the color value functions as a filter. For example, rather than prefetching all of the memory addresses and associated instructions that have the same page number, instead only prefetch the memory addresses and associated instructions that have both the same page number and the same or a similar color value. Thus, the prefetched instructions are limited to those that were fetched by the processor around the same time.

FIG. 3 shows a flow chart that illustrates an example of a method 300 of prefetching instructions to be stored in a L1 icache in accordance with the present invention. Method 300 is similar to method 200 and, as a result, utilizes the same reference numerals to designate the steps that are common to both methods.

As shown in FIG. 3, method 300 diverges from method 200 in that method 300 moves to 310 from both 214 and 260. In 310, method 300 determines a page number (and optionally a color value) of the specific memory address. In addition, method 300 prefetches instructions from a larger cache (e.g., the L2 cache) to obtain all of instructions in the L1 icache with memory addresses that have the same page number (and optional color value) as the page number (and optional color value) of the specific memory address. Only the instructions with the same page number that are not already present in the L1 icache need be prefetched from the L2 cache, although all of the instructions with the same page number can alternately be prefetched from the L2 cache.

Figure 4:
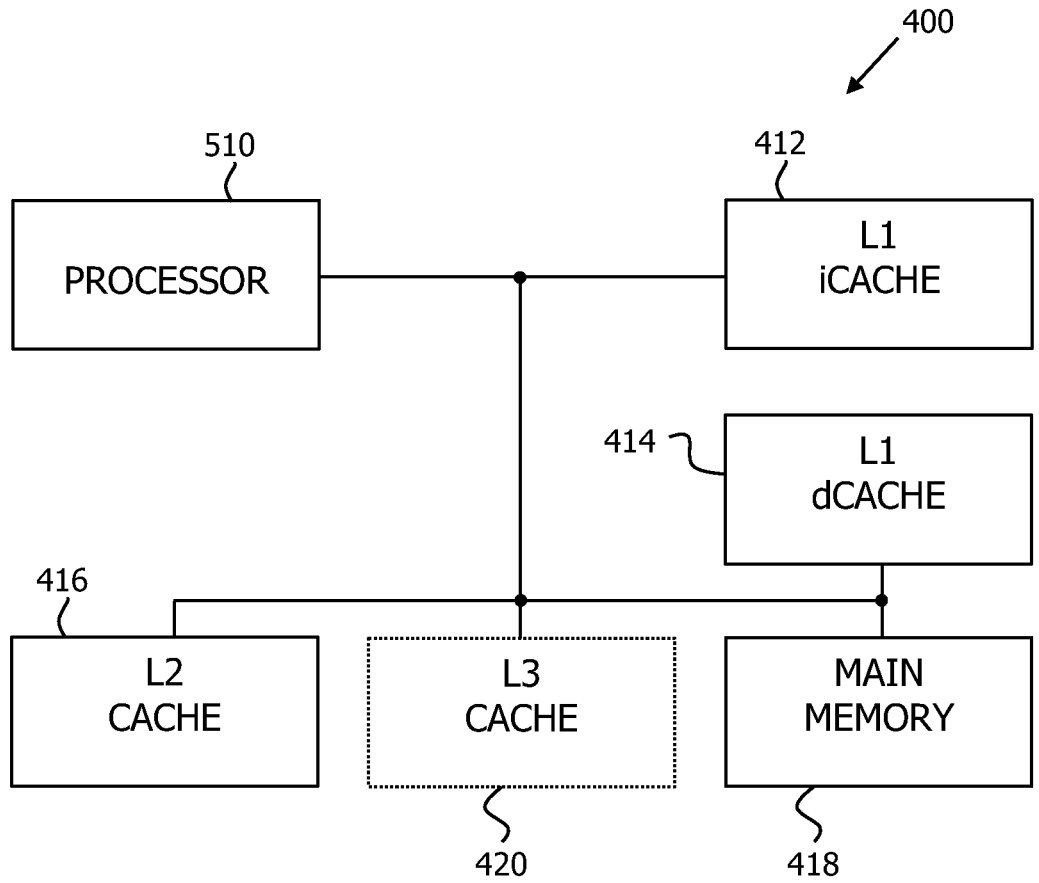
FIG. 4 is a block diagram illustrating an example of a computer system 400 in accordance with the present invention.

FIG. 4 shows a block diagram that illustrates an example of a computer system 400 in accordance with the present invention. As shown in FIG. 4, computer system 400 includes a processor 410, a L1 instruction cache (icache) 412 and a L1 data cache (dcache) 414 that are coupled to processor 410. In the present example, L1 icache 412 and L1 dcache 414 are logically organized as n-way set-associative devices which have a number of sets and a number of ways per set.

As further shown in FIG. 4, computer system 400 also includes a L2 cache 416 that is coupled to L1 icache 412 and L1 dcache 414, and a main memory 418, e.g., a hard drive, flash, PCM, that is coupled to L2 cache 416. Computer system 400 can alternately include a L3 cache 420 that is coupled to L2 cache 416 and main memory 418.

In the present example, L2 cache 416 and L3 cache 420 are also logically organized as an n-way set-associative device with a number of sets and a number of ways per set. In addition, when L2 cache 416 is coupled to a multi-core processor, where each core has separate L1 caches, L2 cache 416 stores information for each of the L1 caches.

Methods 100-300 can be implemented by processor 410, or by dedicated controllers associated with the L1 icache, or a combination of both. Methods 100-300 can also be stored on a non-transitory computer-readable medium that is operably coupled to the processor. The non-transitory computer-readable medium has computer-readable instructions stored thereon which, when accessed by the processor, cause the processor to execute methods 100-300.

Reference has been made in detail to several embodiments. While the subject matter has been described in conjunction with an alternative embodiment, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the preceding detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description were presented and discussed in terms of a method. Although steps and sequencing thereof are disclosed in FIGS. 1-3 herein describing the operations of these methods, such steps and sequencing are exemplary. Embodiments are well suited to performing various other steps or variations of the steps recited in the flowcharts of the figures herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In a typical configuration, a computing device includes one or more processors (CPU), input/output ports, network ports, and memory. The memory may include volatile memory, random-access memory (RAM), and/or non-volatile internal memory of the computer-readable media, such as the read-only memory (ROM), or flash memory (flash RAM). The memory is an example of the computer-readable media.

The computer-readable media include permanent medium and non-permanent medium, movable and immovable medium, and can realize information storage by any mode or technology. The information can be a computer-readable command, data structure, program module, or other data. The examples of computer storage media include, but are not limited to, phase change memory (PCM), static random-access memory (SRAM), dynamic random-access memory (DRAM), other types of random-access memory (RAM), read-only memory (ROM), electrically erasable programmable read-only memory (EEPROM), flash memory or other internal memory technology, compact disk read-only memory (CD-ROM), digital versatile disc (DVD) or other optical storage, tape and cassette tape, magnetic tape or disk storage, or other magnetic storage device or any other non-transmission media which can be used for storing the information that can be accessed by the computing device. As defined in this article, the computer-readable media do not include transitory computer-readable media (transitory media), such as the modulation data signal and carrier wave.

It should also be noted that the terms "include," "contain," or any other variants are intended to cover the non-exclusive "containing" which makes the processes, methods, commodities, or devices having a series of elements include not only those elements, but also other elements not clearly set out, or the inherent elements of these processes, methods, commodities or devices. When there is no any further specification, the element specified by the sentence "including one . . . " does not rule out that there are other identical elements in the processes, methods, commodities, or devices including the elements.

A person skilled in the art shall understand that an embodiment of the invention can be provided as a method, a system, or a computer program product. Therefore, the invention can adopt a form of a full hardware embodiment, full software embodiment, or embodiments combining software with hardware. Furthermore, the invention can also adopt a form of computer program products implemented on one or more computer-readable storage media (including, but not limited to, magnetic disk memory, CD-ROM, and optical memory) containing computer-readable program codes.

It should be understood that the above descriptions are examples of the present invention, and that various alternatives of the invention described herein may be employed in practicing the invention. Thus, it is intended that the following claims define the scope of the invention and that structures and methods within the scope of these claims and their equivalents be covered thereby.

What is claimed is:

1. A method of operating a computer system, the method comprising:

accessing a L1 icache that stores regular instructions and non-instruction information, wherein the non-instruction information comprises non-sequential addresses, and wherein the non-instruction information in the L1 icache further comprises: an address of a read request that results in a miss in the non-instruction information in the L1 icache, and an offset corresponding to the address of the read request that is used to identify a next memory address; and prefetching the next memory address to be stored in the L1 icache, when the next memory address is not present in the L1 icache.

2. The method of claim 1, wherein the L1 icache includes a plurality of sets and a plurality of ways such that each set of the plurality of sets has a number of ways, the number of ways including a first number of ways for storing the regular instructions and a second number of ways for storing the non-instruction information.

3. The method of claim 2, further comprising:

determining whether the L1 icache has received a request to obtain an instruction located at a specific memory address;

determining whether the specific memory address is stored in the first number of ways of the number of ways in the L1 icache; and outputting the instruction associated with the specific memory address to a processor when the specific memory address is stored in the L1 icache.

4. The method of claim 1, further comprising determining whether the address of the read request and the next memory address are sequential or non-sequential, wherein said determining includes determining whether a current value of a program counter is more than one greater than a last value of the program counter, a sequential address having a current value that is one greater than the last value, and a non-sequential address having a current value that is more than one greater than the last value.

5. The method of claim 1, further comprising, when the address of the read request and the next memory address are non-sequential:

accessing the non-instruction information in the L1 icache to identify the offset;

adding the offset to a program counter value representing the address of the read request, to determine the next memory address;

accessing a filter table to determine whether the next memory address is useful;

determining whether the next memory address is already present in the non-instruction information in the L1 icache when the next memory address is useful; and prefetching the next memory address into the L1 icache when the next memory address is useful and not already present in the non-instruction information in the L1 icache.

6. The method of claim 1, further comprising, when the address of the read request and the next memory address are sequential:

accessing a filter table to determine whether the next memory address is useful;

determining whether the next memory address is already present in the non-instruction information in the L1 icache when the next memory address is useful; and prefetching the next memory address into the L1 icache when the next memory address is useful and not already present in the non-instruction information in the L1 icache.

7. The method of claim 1, further comprising:

outputting a request to obtain an instruction associated with a specific memory address to a larger memory when the specific memory address is not stored in the L1 icache;

determining whether the specific memory address is sequential or non-sequential;

mapping a last memory address to the specific memory address to form mapped information when the specific memory address is non-sequential; and storing the mapped information in a correlation table in the L1 icache.

8. The method of claim 1, wherein the non-instruction information comprises a prefetch correlation table, wherein the prefetch correlation table is an array comprising the non-sequential addresses, wherein the prefetch correlation table stores the offset, and wherein the offset is added to a program counter value that represents the address of the read request to determine the next memory address for said prefetching.

9. The method of claim 1, wherein the L1 icache includes a plurality of sets and a plurality of ways such that each set of the plurality of sets has a number of ways, the number of ways including a first number of ways reserved for storing the regular instructions and a second number of ways that are isolated from the first number of ways and reserved for storing the non-instruction information.

10. The method of claim 1, wherein the L1 icache includes a plurality of ways, wherein each way of the plurality of ways comprises a tag, and wherein the tag comprises a bit having a value that indicates whether a way of the plurality of ways stores a regular instruction or stores non-instruction information.

11. A computer system, comprising:

a L1 icache that stores regular instructions and non-instruction information, wherein the non-instruction information comprises non-sequential addresses, and wherein the non-instruction information in the L1 icache further comprises: an address of a read request that results in a miss in the non-instruction information in the L1 icache, and an offset corresponding to the address of the read request that is used to identify a next memory address; and a processor coupled to the L1 icache, the processor being configured to prefetch the next memory address to be stored in the non-instruction information in the L1 icache, when the next memory address is not present in the non-instruction information in the L1 icache.

12. The computer system of claim 11, wherein the L1 icache has a plurality of sets and a plurality of ways such that each set of the plurality of sets has a number of ways, the number of ways including a first number of ways for storing the regular instructions and a second number of ways for storing the non-instruction information.

13. The computer system of claim 12, wherein the processor is further configured to:

determine whether the L1 icache has received a request to obtain an instruction located at a specific memory address;

determine whether the specific memory address is stored in the first number of ways of the number of ways in the L1 icache; and output the instruction associated with the specific memory address to the processor when the specific memory address is stored in the L1 icache.

14. The computer system of claim 11, wherein the processor determines whether the address of the read request and the next memory address are sequential or non-sequential by determining whether a current value of a program counter is more than one greater than a last value of the program counter, a sequential address having a current value that is one greater than the last value, and a non-sequential address having a current value that is more than one greater than the last value.

15. The computer system of claim 11, wherein when the address of the read request and the next memory address are non-sequential, the processor is further configured to:

access the non-instruction information in the L1 icache to identify the offset;

add the offset to a program counter value representing the address of the read request, to determine the next memory address;

access a filter table to determine whether the next memory address is useful;

determine whether the next memory address is already present in the non-instruction information in the L1 icache when the next memory address is useful; and prefetch the next memory address into the L1 icache when the next memory address is useful and not already present in the non-instruction information in the L1 icache.

16. The computer system of claim 11, wherein when the address of the read request and the next memory address are sequential, the processor is further configured to:

access a filter table to determine whether the next memory address is useful;

determine whether the next memory address is already present in the non-instruction information in the L1 icache when the next memory address is useful; and prefetch the next memory address into the L1 icache when the next memory address is useful and not already present in the non-instruction information in the L1 icache.

17. A non-transitory computer-readable medium having computer-readable instructions stored thereon which, when executed by a processor, cause the processor to execute a method of cache prefetching, the method comprising:

accessing a L1 icache that stores regular instructions and non-instruction information, wherein the non-instruction information comprises non-sequential addresses, and wherein the non-instruction information in the L1 icache further comprises: an address of a read request that results in a miss in the non-instruction information in the L1 icache, and an offset corresponding to the address of the read request that is used to identify a next memory address; and prefetching the next memory address to be stored in the non-instruction information in the L1 icache, when the next memory address is not present in the non-instruction information in the L1 icache.

18. The non-transitory computer-readable medium of claim 17, wherein the L1 icache includes a plurality of sets and a plurality of ways such that each set of the plurality of sets has a number of ways, the number of ways including a first number of ways for storing the regular instructions and a second number of ways for storing the non-instruction information.

19. The non-transitory computer-readable medium of claim 18, wherein the method further comprises:

determining whether the L1 icache has received a request to obtain an instruction located at a specific memory address;

determining whether the specific memory address is stored in the first number of ways of the number of ways in the L1 icache; and outputting the instruction associated with the specific memory address to the processor when the specific memory address is stored in the L1 icache.

20. The non-transitory computer-readable medium of claim 17, wherein the method further comprises determining whether the address of the read request and the next memory address are sequential or non-sequential, and wherein said determining includes determining whether a current value of a program counter is more than one greater than a last value of the program counter, a sequential address having a current value that is one greater than the last value, and a non-sequential address having a current value that is more than one greater than the last value.

21. The non-transitory computer-readable medium of claim 17, wherein when the address of the read request and the next memory address are non-sequential, the method further comprises:

accessing the non-instruction information in the L1 cache to identify the offset;

adding the offset to a program counter value representing the address of the read request, to determine the next memory address;

accessing a filter table to determine whether the next memory address is useful;

determining whether the next memory address is already present in the non-instruction information in the L1 icache when the next memory address is useful; and prefetching the next memory address into the L1 icache when the next memory address is useful and not already present in the non-instruction information in the L1 icache.

22. The non-transitory computer-readable medium of claim 17, wherein when the address of the read request and the next memory address are sequential, the method further comprises:

accessing a filter table to determine whether the next memory address is useful;

determining whether the next memory address is already present in the non-instruction information in the L1 icache when the next memory address is useful; and prefetching the next memory address into the L1 icache when the next memory address is useful and not already present in the non-instruction information in the L1 icache.

* * * * *